United States Patent [19]
Thomas

[11] Patent Number: 5,261,624
[45] Date of Patent: Nov. 16, 1993

[54] SAFETY BELT SYSTEM WITH NOISE INHIBITOR

[75] Inventor: Rudy V. Thomas, Sterling Hgts., Mich.

[73] Assignee: AlliedSignal Inc., Del.

[21] Appl. No.: 887,992

[22] Filed: May 22, 1992

[51] Int. Cl.$^5$ ............................................. B60R 22/40
[52] U.S. Cl. ............................................. 242/107.4 A
[58] Field of Search ............... 242/107.4 A, 107.4 B, 242/107.4 D; 280/806; 297/478, 480

[56] References Cited

U.S. PATENT DOCUMENTS

| | | | |
|---|---|---|---|
| 4,509,706 | 4/1985 | Thomas | 242/107.4 A |
| 4,570,873 | 2/1986 | Kurtti | 242/107.4 A |
| 4,607,805 | 8/1986 | Burghardt | 242/107.4 A |
| 4,729,523 | 3/1988 | Saitou et al. | 242/107.4 A |

Primary Examiner—John M. Jillions
Attorney, Agent, or Firm—Markell Seitzman

[57] ABSTRACT

A safety belt system (20) comprising a spool having safety belt webbing (26) attached to a spool (24) retraction mechanism that is spring biased to retract the webbing. The spool is associated with a ratchet wheel (28a,b) and a locking member (42). The locking member is movable into engagement with the ratchet wheel to prevent extension of the webbing under certain vehicle operating conditions. A pendulum-type inertial member (44) associated with the locking member is operable to move the locking member into engagement with the ratchet wheel. The system includes a noise inhibitor assembly (50) which prevents the locking member from rattling under certain operating conditions.

8 Claims, 3 Drawing Sheets

SAFETY BELT SYSTEM WITH NOISE INHIBITOR

BACKGROUND AND SUMMARY OF THE INVENTION

The invention relates generally to a vehicle occupant restraint system and, more particularly, to a noise inhibitor for seat belt retractor.

Some seat belt or safety belt retractors as they are often called comprise a metal lockdog or pawl rotationally mounted therein. The pawl often rests upon an inertia member which moves the pawl into engagement with a tooth on a ratchet wheel to prevent protraction of the safety belt webbing during periods of excessive vehicular deceleration. When in the rest position the pawl will often vibrate or rattle causing an annoying noise. U.S. Pat. No. 4,509,706 illustrates the use of a formed wire segment to selectively block and unblock the pawl to prevent vibration. A disadvantage of this device is that the motion of the pawl is somewhat restricted.

It is an object of the present invention to provide an improved noise inhibitor for a seat belt retractor. Accordingly the invention comprises: a seat belt retractor comprising: a spool rotationally supported on a frame; at least one ratchet wheel rotatable with the spool; safety belt webbing wound about the spool for protraction and retraction; a pawl rotationally supported relative to the frame for lockingly engaging with a tooth on the ratchet wheel, the pawl subject to vibrational movement; a return spring for rotating the spool to retract the webbing; an inertia responsive member to cause the pawl to move into locking engagement with the ratchet wheel, and a noise inhibitor assembly for inhibiting the vibrational movement of the pawl, the assembly comprising: a disk mounted to rotate with the spool; follower means movable into a position of engagement with the pawl upon retraction of the webbing thereby inhibiting vibration and to a position out of engagement with the pawl upon protraction of the webbing.

Many other objects and purposes of the invention will be clear from the following detailed description of the drawings.

DETAILED DESCRIPTION OF THE DRAWINGS

Figure 1:
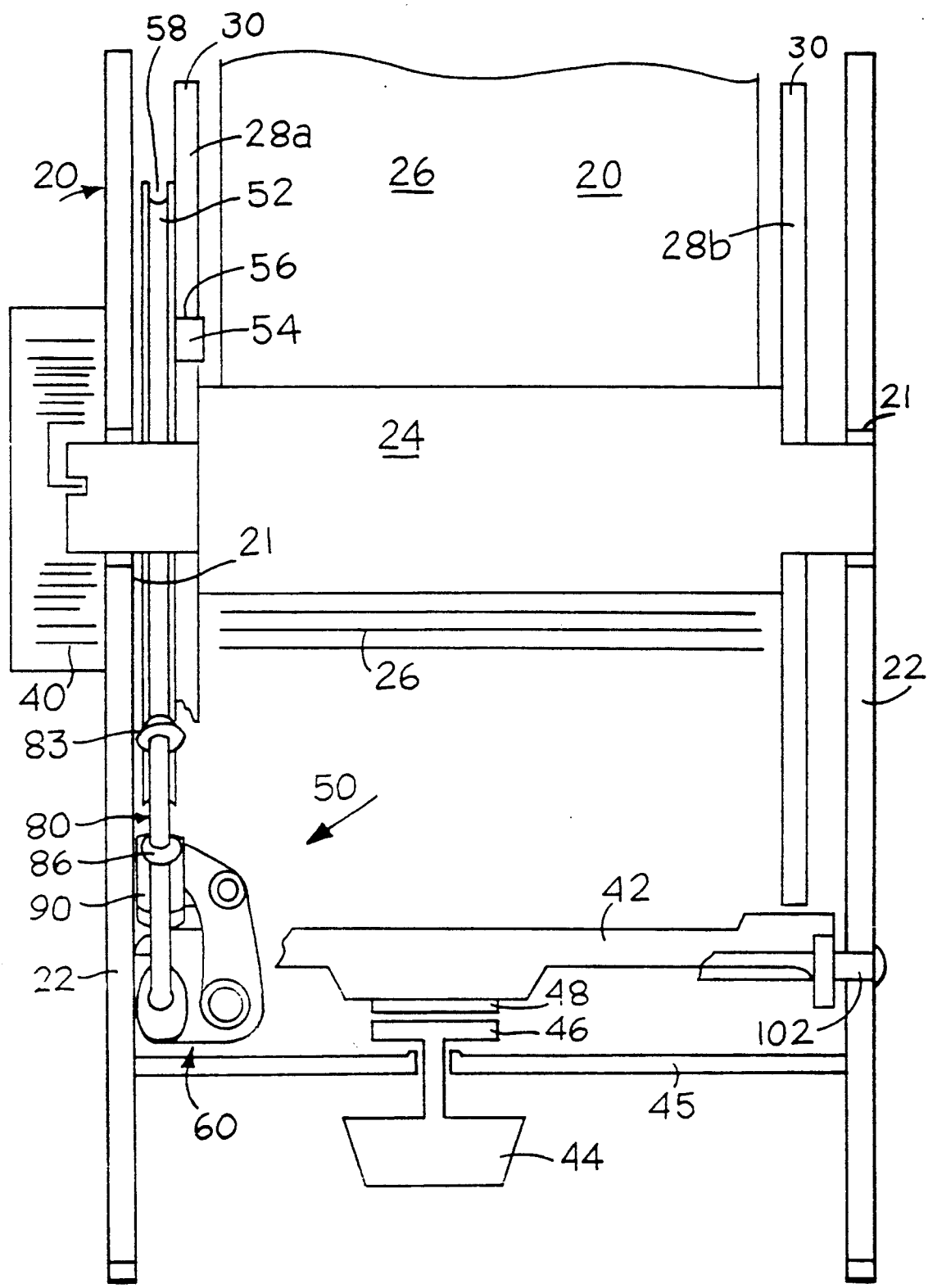
FIG. 1 illustrates a seat belt retractor incorporating the present invention.

Reference is made to FIG. 1 which illustrates a seat belt retractor 20. The retractor 20 includes a frame 22, a spool 24 rotationally supported such as by bearings 21 on the frame and a safety belt webbing 26 positioned about the spool 24 for protraction and retraction. Positioned at opposite ends of the spool 24 are ratchet wheels 28a and 28b, each having ratchet teeth 30. A rewind spring 40 is supported on the frame to rotate the spool 24 and retract the webbing 26. Rotationally supported on the frame is a lockdog or pawl 42 of known type. A pendulum-type inertial member 44 is pivotally supported below the pawl 42 to urge same into a locking relationship with the teeth 30 when the vehicle is subjected to a predetermined level of deceleration. The pendulum member 44 is supported by a portion of the frame generally shown as 45 in a known manner to permit omnidirectional movement. The top of the inertial member 44 forms a cam 46 which engages a cam follower surface 48 that is part of the pawl 44. Upon engagement of the cam 46 with the pawl follower surface 48 the pawl 40 is moved into locking engagement with the teeth of the ratchet wheels 28a and 28b (see FIG. 3).

The retractor 20 includes a noise inhibitor assembly 50 which is only diagrammatically shown in FIG. 1. The assembly 50 includes a wheel, disc or pulley 52 that is rotationally supported outboard of one of the ratchet wheels such as 28a. As shown in FIG. 1 a pulley is used. The pulley includes an extending boss 54 received within a corresponding opening 56 formed within the ratchet wheel 28a. In this manner, the pulley 52 rotates with the spool 24 and ratchet wheels 28a and 28b. The pulley includes a circumferential groove 58. In the preferred embodiment of the invention the groove is convex shaped. The noise inhibitor assembly 50 further includes a, preferably plastic, support member generally shown as 60.

Figure 4:
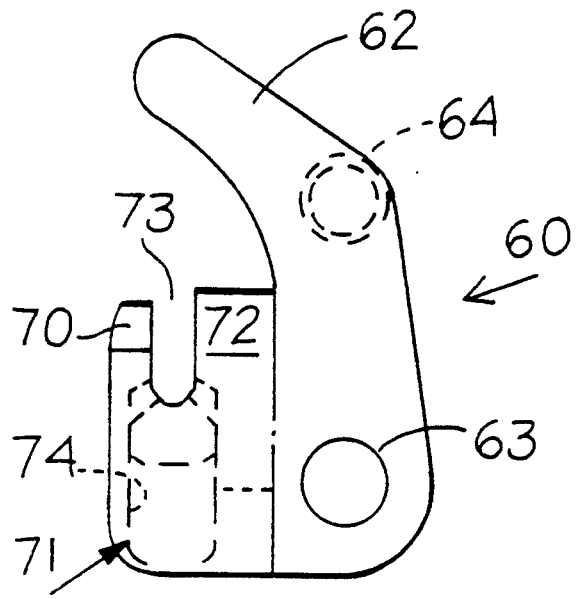
FIGS. 4 and 5 show an isolated views of a support member.
Figure 5:
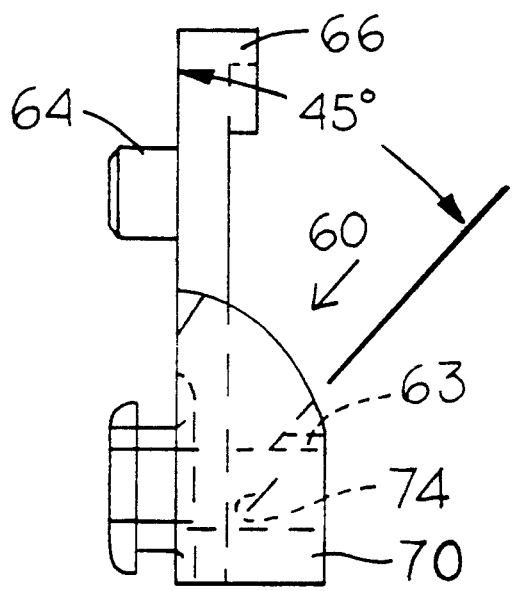

The support member includes an upwardly extending arcuately extending leg 62. The leg 62, at a lower portion thereof, includes an opening 63 through which is received a rivet bolt or snap on feature to mount the support 60 to the retractor frame 22. Extending outwardly from the leg 62 is a boss 64 received within a corresponding opening 65 (see FIG. 2) of the frame. As can be appreciated, the boss 64 and opening 65 serve to rotationally locate the support 60. Extending inwardly from the top of the leg 62 is a stop 66. The member 60 also includes a base portion 70 including a rib member 71, the front surface of which is arcuately, preferably circularly shaped to provide a cam or engagement surface 72. The rear of the base portion 70, that is behind the rib member 71 is hollowed to define a cavity 74. The top of the rib member 71 includes a slot 73 (See FIG. 4) which provides entry into the cavity 74, the purpose of which will be apparent from the description below. As can be seen from FIG. 5 the slot 73 extends along surface 72 about 45 degrees to provide sufficient clearance for the guide pin 80 which moves about 18 degrees.

Figure 6:
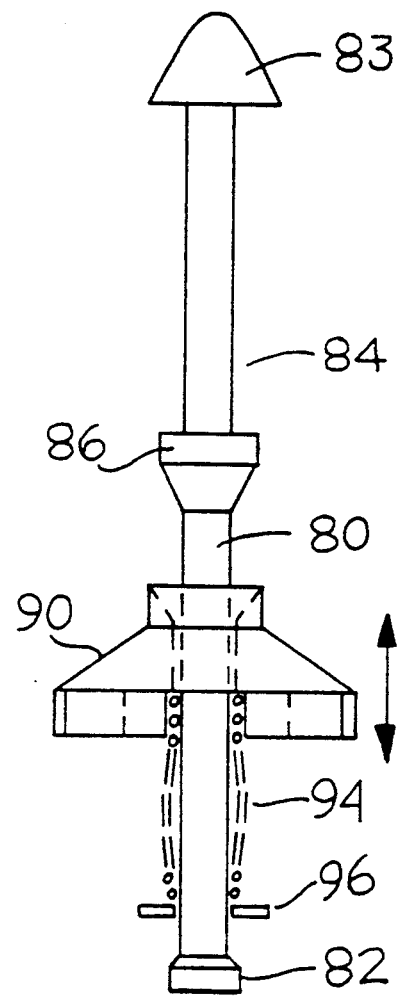
FIG. 6 shows an isolated view of a guide pin and associated parts.
Figure 7:
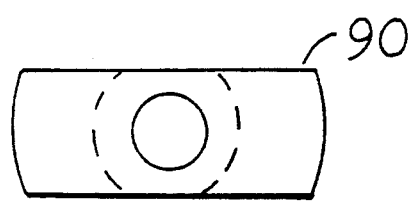
FIG. 7 shows an isolated top view of a cam member.

The inhibitor assembly 50 further includes a guide pin 80 (also shown in FIG. 6). The guide pin 80 includes an enlarged end 82 which is positioned within the slot 73 and freely movable within the cavity 74. As can be appreciated, the interaction between the rib member and the enlarged end 82 prevents the guide pin 80 from being withdrawn from the base portion 70. The other end of the guide pin 80 includes a follower tip 83 conformally shaped to the shape of the groove 58 of the pulley 52. The medial portion 84 of the guide pin 80 includes a triangularly-shaped stop 86 fixed thereto. Slidably received on the lower portion of the guide pin, below the stop 86, is a slidable cam 90. The cam 90 includes a bore 92 into which is received a bias spring 94. The other end of the bias spring abuts a washer 96. As can be seen from the figures, the washer 96 slides over the arcuate surface 72 of the base portion 70. The washer 96 is shown raised from the end 82 and the cam 90 is positioned below the stop 86 for purposes of illustration.

The operation of the present invention is as follows. The guide pin 80, and in particular the tip 83, is received within the groove 58 of the pulley 52. Upon protraction of the seat belt webbing 26, the spool is urged to move clockwise as viewed in FIG. 2 (see arrow 98). Due to the frictional engagement between the tip 83 and the pulley 52, the tip is moved in a generally counter-clockwise manner, as can also be seen from FIG. 2. Upon retraction of the webbing 26 (see FIG. 3) the frictional engagement between the guide pin 80 and the pulley 52 causes the pin to rotate clockwise to the position shown in FIG. 3, with the cam 90 abutting an engagement end 100 of the pawl 42. As can be appreciated, as the pin moves between the positions shown in FIGS. 2 and 3, the pin is also moved into the support 60, against the bias force of spring 94, as the pulley 52 rotates counter-clockwise and is moved outwardly by the spring 94 as the pin 80 is moved to the position illustrated in FIG. 3.

Figures 2, 3:
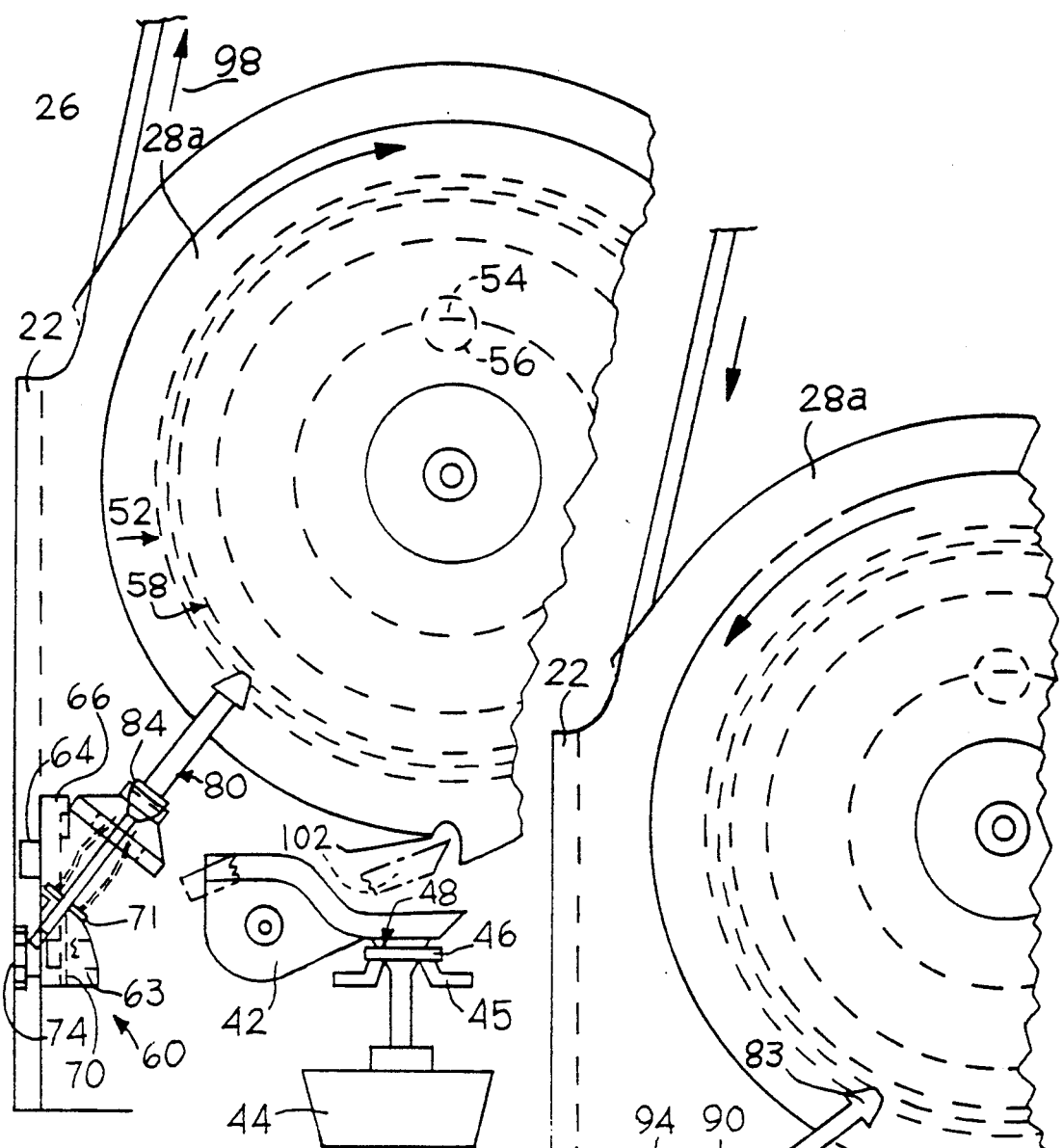
FIG. 2 illustrates a partial side view of a retractor showing a noise inhibitor in an unblocked position.
FIG. 3 illustrates a partial side view of a retractor showing the noise inhibitor in a blocked position.

When the retractor 20 is not in use, the webbing 26 is fully retracted upon the spool 24. In this situation, the noise inhibitor mechanism 50 achieves the orientation as illustrated in FIG. 3 with the cam 90 abutting an end 100 of the pawl 42. As can be appreciated, the cam spring 94 and cam 90 lightly biases the pawl or lockdog 42, inhibiting the pawl 42 from rotating about its pivot axis 102. As such, the tendency of the pawl 42 to vibrate or rattle is lessened. When an occupant of the vehicle uses the retractor, the webbing will be temporarily extended and the noise inhibitor assembly 50 will achieve the orientation illustrated in FIG. 2. Subsequently, as the excess webbing 26 is returned to the retractor, the noise inhibitor assembly will again achieve the orientation shown in FIG. 3. When the vehicle is subject to an excessive acceleration such as for example 0.7 g, the inertial member 44 moves relative to the support 46. The movement of the inertial member 44 causes the pawl to move upwardly so that its tip end 102 enters into locking engagement with one of the teeth 30 on the ratchet wheels 28a and 28b preventing protraction of the webbing. Typically during a severe deceleration or crash condition, a small amount of the seat belt webbing 26 may protract from the spool 24. In this situation, the noise inhibitor mechanism 50 will be moved to the unblocked position as illustrated in FIG. 2. However, even if lockup of the retractor occurs immediately, that is, with the noise inhibitor mechanism remaining in the position as illustrated in FIG. 3, the motion of the pawl 42 is virtually unaffected by the bias force imparted by the spring 94 and cam 90 due to the relatively low spring constant of the spring 94. In such a situation, the pawl 42 rotates upwardly thereby urging the cam 90 downwardly on the guide pin 80. The pawl 42 is shown in its locking position with a tooth, in phantom line, in FIG. 2.

Many changes and modifications in the above described embodiment of the invention can, of course, be carried out without departing from the scope thereof. Accordingly, that scope is intended to be limited only by the scope of the appended claims.

I claim:

1. A seat belt retractor comprising:
   a spool (24) rotationally supported relative to a frame (22);
   at least one ratchet wheel (28a,b) rotatable with the spool (24);
   safety belt webbing (26) wound about the spool (24) for protraction and retraction;
   a locking member (42) rotationally supported relative to the frame for lockingly engaging with a tooth (30) on the ratchet wheel, the locking member subject to vibrational movement;
   a return spring (40) for rotating the spool (24) to retract the webbing;
   an inertia responsive member (44) to cause the locking member (42) to move into locking engagement with the ratchet wheel (26a,b), and
   a noise inhibitor assembly (50) for inhibiting the vibrational movement of the locking member (42), the assembly (50) comprising:
      a disk (52) mounted to rotate with the spool (24); comprising a pulley including a peripheral groove (58) on the edge thereof;
      follower means (60,70,80,90) movable into a position of engagement with the locking member (42) upon retraction of the webbing thereby inhibiting vibration and to a position out of engagement with the locking member upon protraction of the webbing comprising:
   a support (60) secured to the frame (22) comprising a base portion (70) including an arcuate rib member (71) defining an engagement surface (72), the engagement surface including a slot or groove (73); the base portion, interior to the rib member, defining a cavity (74);
   a guide pin (80) received through the slot (73) including a first end (82) received within the cavity and a second end (83) shaped conformally to the shape of the groove (58) frictionally engaging the groove (58) and a first stop (84) between the first and second ends;
   a cam (90) slidable on the guide pin (80) and biased toward the first stop (84) by a bias spring (94), the cam (90) moved away from the locking member (42) upon rotation of the pulley (52) during retraction of the webbing and into engagement with the locking member upon retraction of the webbing with the cam restricting motion of the locking member to prevent the vibration thereof.

2. The device as defined in claim 1 wherein the cam includes a conically-shaped engagement surface engageable with an end (100) of the locking member (42).

3. The device as defined in claim 1 wherein the first end (82) of the guide pin (80) is wider than the width of the slot (73).

4. The device as defined in claim 1 wherein the support (60) includes an extending leg member (62), the end of which defines a second stop (66) to limit the motion of the cam (90) during webbing protraction.

5. A seat belt retractor comprising:
   a spool rotationally supported relative to a frame;
   safety belt webbing wound about the spool for protraction and retraction;
   locking means for halting the rotation of the spool, wherein the locking means is subject to vibrational movement, the locking means movable into a position of locking engagement in which the motion of the spool is stopped;
   an inertia responsive member to cause the locking means into its position of locking engagement; and
   a noise inhibitor assembly for inhibiting the vibrational movement of the locking, the assembly comprising:

a disk mounted to rotate with the spool; comprising a pulley including a peripheral groove on the edge thereof;

follower means movable into a position of engagement with the locking means upon retraction of the webbing thereby inhibiting vibration and to a position out of engagement with the locking means upon protraction of the webbing comprising:

a support secured to the frame comprising a base portion including an arcuate rib member defining an engagement surface, the engagement surface including a slot or groove; the base portion, interior to the rib member, defining a cavity;

a guide pin received through the slot including a first end received within the cavity and a second end shaped conformally to the shape of the groove fictionally engaging the groove and a first stop between the first and second ends;

a cam slidable on the guide pin and biased toward the first stop by a bias spring, the cam moved away from the locking means upon rotation of the pulley during retraction of the webbing and into engagement with the locking means upon retraction of the webbing with the cam restricting motion of the locking means to prevent the vibration thereof.

6. The device as defined in claim 5 wherein the cam includes a conically-shaped engagement surface engageable with an end of the locking means.

7. The device as defined in claim 5 wherein the first end of the guide pin is wider than the width of the slot.

8. The device as defined in claim 5 wherein the support includes an extending leg member, the end of which defines a second stop to limit the motion of the cam during webbing protraction.

* * * * *